United States Patent
Schuetz

(10) Patent No.: US 7,597,344 B2
(45) Date of Patent: Oct. 6, 2009

(54) ASSEMBLY WITH A GAS BAG MODULE AND A LOCKING CHECK ARRANGEMENT

(75) Inventor: Dominik Schuetz, Waldaschaff (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 253 days.

(21) Appl. No.: 11/639,702

(22) Filed: Dec. 15, 2006

(65) Prior Publication Data
US 2007/0138770 A1 Jun. 21, 2007

(30) Foreign Application Priority Data
Dec. 21, 2005 (DE) .................. 20 2005 019 961 U

(51) Int. Cl.
*B60R 21/217* (2006.01)
*B60R 21/203* (2006.01)

(52) U.S. Cl. ..................... 280/728.2; 280/731

(58) Field of Classification Search ............. 280/728.2, 280/731, 732, 728.1; 200/61.54, 61.55
See application file for complete search history.

(56) References Cited

U.S. PATENT DOCUMENTS

| | | | |
|---|---|---|---|
| 4,974,873 A * | 12/1990 | Kaiguchi et al. ............. 280/735 |
| 5,380,037 A | 1/1995 | Worrell et al. | |
| 5,505,483 A | 4/1996 | Taguchi et al. | |
| 6,675,675 B1 * | 1/2004 | Sauer et al. .................... 74/552 |
| 6,688,638 B2 * | 2/2004 | Schutz ..................... 280/728.2 |
| 6,846,011 B2 | 1/2005 | Schutz et al. | |
| 7,114,745 B2 | 10/2006 | Schutz et al. | |
| 2004/0119582 A1 * | 6/2004 | Schutz et al. ............. 340/425.5 |
| 2005/0230942 A1 | 10/2005 | Erlingstam et al. | |
| 2007/0138772 A1 * | 6/2007 | Schuetz ..................... 280/728.2 |

FOREIGN PATENT DOCUMENTS

| | | |
|---|---|---|
| DE | 4414761 | 11/1994 |
| DE | 19854335 | 6/2000 |
| DE | 20204461 | 8/2002 |
| DE | 20219124 | 5/2003 |

* cited by examiner

*Primary Examiner*—Paul N. Dickson
*Assistant Examiner*—Drew J. Brown
(74) *Attorney, Agent, or Firm*—Tarolli, Sundheim, Covell & Tummino LLP

(57) ABSTRACT

In an assembly with a gas bag module and a locking check arrangement, the gas bag module has a first detent element adapted for engagement with a second detent element to form a detent connection fastening the gas bag module to a vehicle-fixed component. The gas bag module can assume a not correctly locked state, in which the first detent element and the second detent element are in contact with each other but are not in correct engagement, and a correctly locked state, in which the first detent element is in correct engagement with the second detent element. The locking check arrangement has a movably arranged checking element for checking a locking status of the detent connection and indicating whether the gas bag module is in the not correctly locked state.

14 Claims, 1 Drawing Sheet

ASSEMBLY WITH A GAS BAG MODULE AND A LOCKING CHECK ARRANGEMENT

FIELD OF THE INVENTION

The invention relates to an assembly with a gas bag module and a locking check arrangement.

BACKGROUND OF THE INVENTION

Gas bag modules have become part of the standard equipment in passenger cars. For this reason, their installation should of course be able to be carried out quickly and at a favourable cost, without any curtailment to safety. Detent connections present themselves for this purpose, in which for example detent hooks connected with the gas bag module engage into a complementary detent element on a vehicle-fixed component, e.g. a spring wire, in order to connect the gas bag module with the vehicle in a secure and load-bearing manner. Such a detent connection can be produced in a very time-saving manner. However, in detent connections of this type, an incorrectly locked state can occur in which the detent elements are in fact already in contact with each other, but the detent hook has not yet engaged behind the spring wire correctly. As the locking mechanism generally can not be seen from the exterior, such incorrect lockings are difficult to detect. Of course, it must be ensured that the detent connection is correctly closed and the gas bag module is securely fixed in the vehicle. Checking takes time and therefore makes the installation more expensive. It is, therefore, an object of the invention to provide an option for quickly and simply detecting such detent connections which are not correctly locked.

BRIEF SUMMARY OF THE INVENTION

For this, in an assembly with a gas bag module and a locking check arrangement, the gas bag module has a first detent element adapted for engagement with a second detent element to form a detent connection fastening the gas bag module to a vehicle-fixed component. The gas bag module can assume a not correctly locked state, in which the first detent element and the second detent element are in contact with each other but are not in correct engagement, and a correctly locked state, in which the first detent element is in correct engagement with the second detent element. The locking check arrangement has a movably arranged checking element for checking a locking status of the detent connection and indicating whether the gas bag module is in the not correctly locked state. A section of the checking element assumes in the not correctly locked state of the gas bag module a first position that, in the assembled state and viewed from the exterior, corresponds to a first indicator position of the checking element, and assumes in a correctly locked state of the gas bag module a second position that, in the assembled state and viewed from the exterior, corresponds to a second indicator position of the checking element. The first indicator position is different from the second indicator position.

In contrast to the actual detent connection, the checking element can, for example, be detected visually or haptically from the exterior of e.g. a covering part behind which the detent connection is arranged, so that a check on the state of the detent connection is possible from the vehicle interior without a direct access to the detent connection itself. It will therefore become clear that the detent connection is not correctly locked from the presence or absence of the checking element at a particular location.

The checking element may, for example, press a section of a covering part outwards, e.g. make it bulge, only if the checking element is in the first or only if the checking element is in the second position.

Alternatively, the checking element or the component coupled therewith projects through an opening in a facing piece only if the checking element is in the first or only if the checking element is in the second position.

In both cases, the first or second indicator position of the checking element can be detected visually or by feel, whereby a checking of the detent connection is made possible.

In a preferred embodiment of the invention, the checking element is formed by a section of the second detent element. Alternatively, it can be a separate component coupled with the second detent element.

The second detent element is preferably arranged so as to be displaceable. Advantageously, the position of the checking element is changed by the movement of the second detent element.

The second detent element may, for example, be a spring wire or a more or less rigid plate which is then preferably acted upon elastically by a predetermined force.

To close the detent connection, the second detent element is at first deflected by the first detent element before the actual detent engagement takes place. In the not correctly locked state, the second detent element remains in its deflected position. According to the invention, this deflection of the second detent element is used to provide an indication of a detent connection which is not correctly closed, and therefore of a gas bag module which is not in the correctly locked state.

Such a check is, for example, advantageous for gas bag modules inserted into a steering wheel.

DETAILED DESCRIPTION OF A PREFERRED EMBODIMENT

Figure 1:
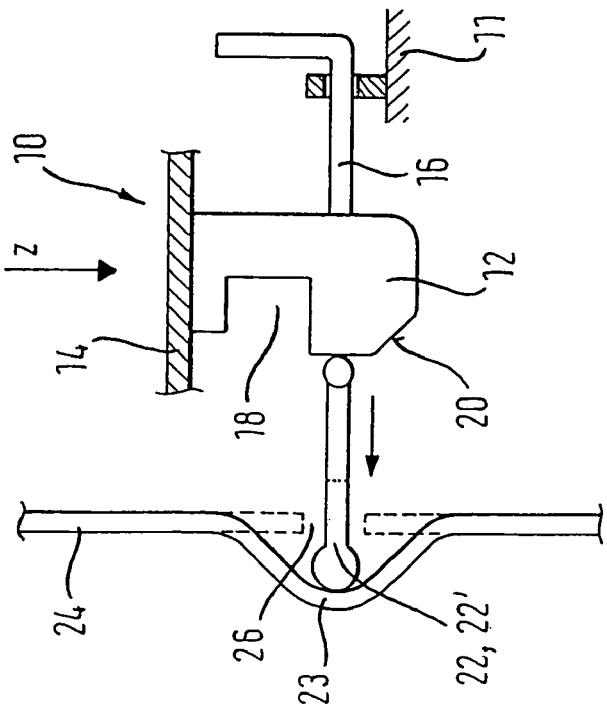
FIG. 1 shows a diagrammatic detail of an assembly with a gas bag module according to the invention in a not correctly locked state.

In FIG. 1 an assembly is shown comprising a gas bag module 10 a locking check arrangement. A detent connection is shown between a gas bag module 10 and a vehicle-fixed component 11. The gas bag module 10 is merely indicated by one of its first detent elements 12, here a detent hook, and a base plate 14 connected therewith, e.g. a generator carrier, of a known module housing which is not illustrated in further detail. Inside the module housing there are a folded gas bag (not shown) and a gas generator (also not shown), which provides filling gas for inflating the gas bag. The vehicle-fixed component 11 is also only indicated diagrammatically and may, for example, be a hub of a steering wheel, a mounting plate in front of the steering wheel hub, or a section of an instrument panel. These are all known elements which are not described in further detail here.

A second detent element 16 is fastened to the vehicle-fixed component 11. The second detent element 16, here a spring wire, has at least one elastically deflectable section or is arranged displaceably and is temporarily moved to the side during the closing of the detent connection between the first detent element 12 and the second detent element 16, and finally comes into engagement with a detent recess 18 of the first detent element 12. The second detent element 16 could also be a rigid plate which is acted upon displaceably in the lateral direction by means of a spring (not illustrated). It is also possible to use other forms of the second detent element 16, in which a section of the second detent element 16 can be deflected.

To close the detent connection, the gas bag module 10 is moved in the z direction towards the second element 16. In doing this, a guide ramp 20 of the first detent element 12 comes in contact with the displaceable section of the second detent element 16 and moves the latter to the side (towards the left in FIG. 1, see arrow).

Now it can occur that the two detent elements 12, 16 remain in the position shown in FIG. 1, in which the detent connection and therefore also the gas bag module 10 are in the not correctly locked state. The second detent element 16 is deflected, but has not yet engaged into the detent recess 18 of the first detent element 12.

To detect this condition, in the assembly a locking check arrangement with a checking element 22 is provided. In this example, the checking element 22 is designed as a part of the second detent element 16, and specifically the section projecting furthest towards the left. The checking element 22 follows the lateral movement of the second detent element 16. If the gas bag module 10 is in the not correctly locked state, the checking element 22 is in a first position (shown in FIG. 1), namely deflected laterally towards the left. The checking element 22 does not have to be formed in one piece with the second detent element 16, it could also be a separate component 22' coupled therewith (indicated in the figures by the dotted line).

The checking element 22 is arranged such that when deflected to its maximum degree, shown in FIG. 1, it causes a section 23 of a covering part 24 to bulge outwards.

Alternatively, the checking element 22 may also project through an opening 26 in the covering part 24 (shown in dashed lines in FIG. 1).

It is only in this first position that the checking element 22 presses the covering part 24 outwards or projects through the opening 26 in the covering part 24. In the assembled state and viewed from the exterior (of the covering part 24), i.e. from the vehicle interior, the checking element 22 is now in a first indicator position indicating a locking status of the detent connection and, in this case, indicating by the bulge in the covering part 24 or the section of the checking element 22 extending through the opening 26 or being visibly in the opening 26 that the gas bag module 10 is in the not correctly locked state.

The restoring force for the second detent element 16 may be assisted or produced entirely by the elasticity of the covering part 24.

The covering part 24 is, for example, the outer cover of a hub cup of a steering wheel or the outer lining of an instrument panel or a part of an outer skin of a seat backrest. In each case, the section 23 of the covering part 24 can be seen or felt from the outside of the covering, i.e. from the interior of the vehicle.

Figure 2:
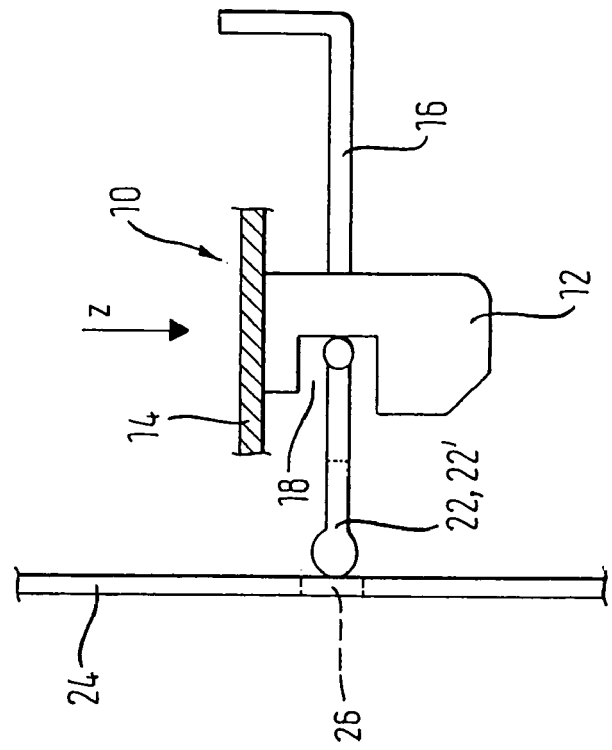
FIG. 2 shows the assembly of FIG. 1 with the gas bag module in the correctly locked state.

In the correctly locked state of the gas bag module 10, which is shown in FIG. 2, on the other hand, the movable section of the second detent element 16 engages into the detent recess 18 of the first detent element 12. Compared with the situation shown in FIG. 1, the movable section of the second detent element 16 has moved towards the right again. Through this, the checking element 22 is now in its second position, in which it does not cause the covering part 24 to bulge outwards or does not penetrate through the opening 26 in the covering part 24.

In the assembled state and viewed from the exterior, i.e. from the vehicle interior, the checking element 22 is now in a second indicator position indicating a locking status of the detent connection and, in this case, indicating that the gas bag module is in the correctly locked state.

Of course, the checking element 22 may also be designed and arranged so that the situation is reversed: then, in the correctly locked state (corresponding to the second indicator position), the checking element 22 would cause the covering part 24 to bulge outwards or project through the opening 26, whereas in the not correctly locked state (corresponding to the first indicator position), the checking element 22 could not be felt or seen from the exterior of the gas bag module or the steering wheel. In any case, the second indicator position is different from the first indicator position.

It would also be conceivable to design the checking element 22 to be removable. In this case, advantageously a separate component 22' would be used as the checking element 22, as described above. With a correctly locked gas bag module 10, the checking element 22 is then situated in the first position, in which it projects through the opening 26, and it can be removed from the gas bag module 10. It is, of course, also possible to provide a coding in order to subsequently prove that this specific detent connection was locked correctly.

If the checking element 22 used deflects or buckles out the covering part 24, the covering part 24 is preferably made from polyurethane so as to be flexible.

Of course, vice versa, the first detent element 12 may also be arranged so as to be displaceable or able to be deflected, and the second detent element 16 may be securely arranged. Then, the checking element 22 could be arranged on or coupled with the first detent element 12. Likewise, both detent elements may be designed so as to deflectable or displaceable. A vertical deflection of the first or the second detent element 12, 16 could also be used.

Although in this example the second detent element 16 is shown arranged on the vehicle-fixed component 11, it is clear, that, alternatively, the second detent element 16 could be arranged on the gas bag module 10, while the first detent element 12 would be arranged on the vehicle-fixed component 11.

The invention claimed is:

1. Assembly of a gas bag module and a locking check arrangement,
    comprising a first detent element (12) adapted for engagement with a second detent element (16) to form a detent connection fastening the gas bag module (10) to a vehicle-fixed component (11),
    the gas bag module being able to assume a not correctly locked state, in which the first detent element (12) and the second detent element (16) are in contact with each other but are not in correct engagement, and a correctly locked state, in which the first detent element (12) is in correct engagement with the second detent element (16),
    the locking check arrangement comprising a movably arranged checking element (22) for checking a locking status of the detent connection and indicating whether the gas bag module (10) is in the not correctly locked state,
    a section of the checking element (22) assuming in the not correctly locked state of the gas bag module (10) a first position that, in the assembled state and viewed from the exterior, corresponds to a first indicator position of the checking element (22), and assuming in a correctly locked state of the gas bag module (10) a second position that, in the assembled state and viewed from the exterior, corresponds to a second indicator position of the checking element (22), the first indicator position being different from the second indicator position.

2. The assembly according to claim 1, wherein the checking element (22) presses a section of a covering part (24) outwards only if the checking element (22) is in the first position or only if the checking element (22) is in the second position.

3. The assembly according to claim 1, wherein the checking element (22) projects through an opening (26) in a covering part (24) only if the checking element (22) is in the first position or only if the checking element (22) is in the second position.

4. The assembly according to claim 1, wherein the checking element (22) is a section of the second detent element (16).

5. The assembly according to claim 1, wherein the checking element (22) is a separate component (22') coupled to the second detent element (16).

6. The assembly according to claim 1, wherein the second detent element (16) is arranged so as to be displaceable.

7. The assembly according to claim 1, wherein the second detent element (16) is one of a spring wire and a plate.

8. The assembly according to claim 1, wherein during the closing of the detent connection (12, 16) the second detent element (16) is deflected laterally and this deflection remains in existence in the not correctly locked state of the gas bag module (10).

9. The assembly according to claim 1, wherein the gas bag module (10) is inserted into a steering wheel.

10. The assembly according to claim 1, wherein the section of the checking element (22) moves from the first position to the second position when the gas bag module moves from the not correctly locked state to the correctly locked state, the position of the section of the checking element being visible from the exterior.

11. Assembly of a gas bag module and a locking check arrangement,
   comprising a first detent element (12) adapted for engagement with a second detent element (16) to form a detent connection fastening the gas bag module (10) to a vehicle-fixed component (11),
   the gas bag module being able to assume a not correctly locked state, in which the first detent element (12) and the second detent element (16) are in contact with each other but are not in correct engagement, and a correctly locked state, in which the first detent element (12) is in correct engagement with the second detent element (16),
   the locking check arrangement comprising a movably arranged checking element (22) that follows the movement of the second detent element, for checking a locking status of the detent connection and indicating whether the gas bag module (10) is in the not correctly locked state,
   a section of the checking element (22) assuming in the not correctly locked state of the gas bag module (10) a first position that, in the assembled state and viewed from the exterior, corresponds to a first indicator position of the checking element (22), and assuming in a correctly locked state of the gas bag module (10) a second position that, in the assembled state and viewed from the exterior, corresponds to a second indicator position of the checking element (22), the first indicator position being different from the second indicator position.

12. Assembly of a gas bag module and a locking check arrangement,
   comprising a first detent element (12) adapted for engagement with a second detent element (16) to form a detent connection fastening the gas bag module (10) to a vehicle-fixed component (11),
   the gas bag module having a not correctly locked state, in which the first detent element (12) and the second detent element (16) are in contact with each other but are not in correct engagement, and a correctly locked state, in which the first detent element (12) is in correct engagement with the second detent element (16),
   the locking check arrangement comprising a movably arranged checking element (22) for checking a locking status of the detent connection and indicating whether the gas bag module (10) is in the not correctly locked state,
   a section of the checking element (22) assuming in the not correctly locked state of the gas bag module (10) a first position that, in the assembled state, corresponds to a first indicator position of the checking element (22), and assuming in a correctly locked state of the gas bag module (10) a second position that, in the assembled state, corresponds to a second indicator position of the checking element (22), the first indicator position being different from the second indicator position and
   the presence or absence of the section of the checking element (22) in the first or the second indicator position is one of visually and haptically detected from the exterior.

13. The assembly according to claim 12, wherein the presence or absence of the section of the checking element (22) in the first or the second indicator position is visually detected as viewed from the exterior.

14. The assembly according to claim 12, wherein the presence or absence of the section of the checking element (22) in the first or the second indicator position is haptically detected from the exterior.

* * * * *